United States Patent
Ono et al.

(10) Patent No.: US 6,782,273 B2
(45) Date of Patent: Aug. 24, 2004

(54) PORTABLE WIRELESS APPARATUS

(75) Inventors: Shuichi Ono, Tokyo (JP); Mitsuru Kuroda, Tokyo (JP)

(73) Assignee: NEC Corporation, Tokyo (JP)

( * ) Notice: Subject to any disclaimer, the term of this patent is extended or adjusted under 35 U.S.C. 154(b) by 584 days.

(21) Appl. No.: 09/858,776

(22) Filed: May 16, 2001

(65) Prior Publication Data

US 2001/0044320 A1 Nov. 22, 2001

(30) Foreign Application Priority Data

May 16, 2000 (JP) ........................................ 2000-143310

(51) Int. Cl.$^7$ ................................................ H04B 1/38
(52) U.S. Cl. .................. 455/550; 455/575.4; 455/575.7
(58) Field of Search ............................. 455/550, 575.4, 455/575.7, 90.1, 95, 562.1, 568.3; 343/702; D14/138, 148

(56) References Cited

U.S. PATENT DOCUMENTS 5,926,748 A * 7/1999 Yoshihara et al. ....... 455/575.7
6,208,874 B1 * 3/2001 Rudisill et al. .......... 455/575.4

FOREIGN PATENT DOCUMENTS

| EP | 0 661 825 A1 | 7/1995 | | |
|----|----|----|----|----|
| JP | 2658906 | 6/1997 | | |
| JP | 2689881 | 8/1997 | | |
| JP | 10-22862 | 1/1998 | | |
| JP | 10022862 | * | 1/1998 | ............ H04B/1/38 |
| JP | 11-136015 | 5/1999 | | |
| JP | 2000-269715 | 9/2000 | | |

* cited by examiner

Primary Examiner—Nay Maung
Assistant Examiner—Alan T. Gantt
(74) Attorney, Agent, or Firm—Scully, Scott Murphy & Presser

(57) ABSTRACT

A wireless apparatus having a foldable structure allowing improved antenna condition when opened with improved convenience is disclosed. A first housing and a second housing coupled by a hinge are freely opened and closed around the hinge. An antenna section for use in wireless communication is coupled to the first and second housings by the hinge such that the antenna section is situated at back of the second housing and is freely opened and closed around the hinge with respect to the second housing. A spring force is applied to the antenna section to rotate it in an opening direction. The antenna section is latched by an antenna latch member to be kept in a closed state. When the first housing and the second housing are opened to a predetermined angle, the latch is released to open the antenna section away from the second housing.

18 Claims, 11 Drawing Sheets

PORTABLE WIRELESS APPARATUS

BACKGROUND OF THE INVENTION

1. Field of the Invention

The present invention relates to a portable wireless terminal, and in particular to a wireless terminal that is designed to open and close a first housing and a second housing of its components by a hinge mechanism.

2. Description of the Related Art

Among portable wireless terminals typified by a mobile telephone such as PHS (Personal Handy phone System), many of them focusing on portability are designed to realize miniaturization such that a handset is removed and receiving and transmitting portions (a speaker and a microphone) thereof are mounted directly on a main body of the terminal. Also, there are such many requirements that various information such as text information or visual imagery can be displayed in an easily readable size and various data can be smoothly input. To meet these requirements, many wireless terminals employ a fordable structure having two housings composing the main body thereof to be opened when used.

In the case of a wireless telephone employing such a fordable structure, the main body having the receiving portion and the transmitting portion therein is closely contacted with the head of a user. At this time, since the antenna is positioned extremely close to the head of a user, there is developed such a problem that the efficiency of antenna decreases duo to the absorption of radio wave sent from antenna in a human body.

For example, in the wireless terminal disclosed in Japanese Patent Laid-open No. Hei 11-136015, the first housing and the second housing are allowed to be freely opened and closed by the hinge mechanism and an antenna is mounted in one of these housings. When a user has this wireless terminal by hand in such a manner that it is pressed against the user's head, the efficiency decreases and its power is consumed in vain because the antenna is arranged extremely close to a human body. Therefore, there have been proposed some wireless terminals that are designed to allow the antenna to be arranged apart from a human body as far as possible when used.

FIG. 1 shows a conventional portable wireless terminal disclosed in Japanese Patent No. 2689881. in this portable wireless terminal 100, a first housing 101 and a second housing 102 composing the main body thereof are freely opened and closed by a hinge mechanism 103. In FIG. 1, the closed state of the case 101 and the case 102 is shown by a phantom line, and the open state is shown by a solid line. At the side of the case 102, an antenna 104 is provided parallel to the case 102. The antenna 104 is independently and rotatably attached to the hinge mechanism 103. Therefore, as shown by an arrow 105, when the antenna 104 is rotated forming a more obtuse angle with respect to the first housing 101 on telephone conversation, the efficiency of radio wave sent from the antenna 104 becomes improved.

However, in the wireless terminal 100 as shown in FIG. 1, at the side of the case 102, the antenna 104 is provided parallel to the case 102. Therefore, in the case where the antenna 104 is designed not to protrude from the main body when the second housing 102 is closed to the first housing 101, the total widths including both second housing 102 and antenna 104 (the length in an axial direction of the hinge mechanism 103) is required to be approximately same as the width of first housing 101. Therefore, the width of the second housing 102 gets narrower than that of first housing 101 only by the width of antenna 104. On the second housing 102, a liquid crystal display or the like is usually arranged. Accordingly, there is such a disadvantage that the size of the display is relatively reduced.

FIG. 2 shows another conventional wireless terminal that is designed to solve the above-described disadvantage. In a wireless terminal 110 disclosed in Japanese Patent No. 2658906, a first housing 111 and a second housing 112 composing the main body thereof are freely opened and closed by a hinge mechanism 113. In this conventional wireless terminal, differing from the wireless terminal 100 as shown in FIG. 1, the length of first housing 111 is longer than that of second housing 112. At the end portion of a protrusion 114 attaching a hinge mechanism 113 therewith, an antenna 116 is installed to be rotated 90 degrees through an antenna hinge portion 115. This antenna 116 is accommodated parallel to a shaft 118 of the hinge mechanism 113 when the terminal is not used. On the other hand, on wireless communication, it is rotated in the direction of an arrow 119 to form a right angle with respect to the shaft 118, and then an end portion 116A is pulled out.

In this conventional wireless terminal 110, since the width of the second housing 112 is equal to that of the first housing 111, it can secure the larger display size than that in the first example of FIG. 1. In the conventional wireless terminal 110 as shown in FIG. 2, a spring mechanism (not shown) is employed so that the first housing 111 and the second housing 112 are opened to form a predetermined angle when the terminal 110 is used. When no used, the first housing 111 and the second housing 112 are closed and held by means of a first magnet (not shown). Similarly, the opening mechanism of the antenna 116 is realized by means of a spring (not shown). When the terminal is not used, the antenna 116 is accommodated and held parallel to the shaft 118 by means of a second magnet (not shown).

The wireless terminal 110 of FIG. 2 is further provided with a sliding button, which is used to release the holding force of the first and second magnets to open the first housing 111 and the second housing 112 to form the predetermined angle and to rotate the antenna 116 to a maximum right angle with respect to the shaft 118. In this state, a user pulls out the top 116A of the antenna 116 for radio communication.

In the wireless terminal 110 as shown in FIG. 2, the antenna 116 is designed to be accommodated across the width of the first housing 111 and the second housing 112. Therefore, the length of the antenna 116 when accommodated is rather shorter than that when used. Therefore, when the terminal 110 is used, it is necessary to extend the antenna 116 with inconvenience.

Thus, although the mobile telephone is mainly described, the same problem remains in the other wireless terminals such as a compact computer mounted with a microphone and speaker in the main body thereof.

SUMMARY OF THE INVENTION

An object of the present invention is to provide a wireless apparatus having a foldable structure allowing improved antenna condition when the terminal is opened.

Another object of the present invention is to provide a wireless apparatus having an automatic opening structure allowing an antenna to be automatically opened with improved antenna condition.

According to the present invention, a portable wireless apparatus includes: a first housing; a second housing coupled to the first housing by a hinge, wherein the first housing and the second housing are freely opened and closed around the hinge within a first predetermined range having a maximum of a first angle, an antenna section for use in wireless communication, coupled to the first and second housings by the hinge such that the antenna section is situated at back of the second housing, wherein the antenna section is freely opened and closed around the hinge within a second predetermined range having a maximum of a second angle with respect to the second housing; an antenna energizing member for applying a force to the antenna section in an opening direction; an antenna latch member for latching the antenna section to the second housing to keep the antenna section in a closed state; and an antenna latch releasing mechanism for releasing a latch of the antenna latch member when an angle formed between the first housing and the second housing reaches a third angle within the first predetermined range.

Since the antenna section is situated at the back of the second housing, the length of the antenna section can be set to at least the longitudinal length of the first and second housings, ensuring the minimum length necessary for communication.

Further, since the antenna section can be rotated around the hinge when the latch is released, the antenna section can be further rotated by the second angle with respect to the second housing, allowing the antenna to be arranged apart from a human body and resulting in improved efficiency of antenna.

Furthermore, when the first and second housings are opened at the first angle, the antenna section is automatically opened, resulting in improved convenience. When no communication is made, the first and second housings as well as the antenna section can be closed to make the apparatus compact.

Preferably, the portable wireless apparatus further includes: a housing energizing member for applying a force to the first and second housings in an opening direction; a housing latch member for latching the first and second housings to each other to keep tho first and second housings in a closed state; and a housing latch releasing mechanism for manually releasing a latch of the housing latch member.

Since the first and second housings can be opened by releasing the latch of the housing latch member, only one operation of the housing latch releasing mechanism causes the first and second housings as well as the antenna section to be automatically opened.

According to another aspect of the present invention, a portable wireless apparatus includes: a first housing; a second housing coupled to the first housing by a hinge, wherein the first housing and the second housing are freely opened and closed around the hinge within a first predetermined range having a maximum of a first angle; an antenna section for use in wireless communication, coupled to the first and second housings by the hinge such that the antenna section is placed outside the second housing, wherein the antenna section is freely opened and closed around the hinge within a second predetermined range having a maximum of a second angle with respect to the second housing; an antenna driver for rotating the antenna section in an opening direction; and an antenna driver controller for starting the antenna driver rotating the antenna section in the opening direction when an angle formed between the first housing and the second housing reaches a third angle within the first predetermined range.

Preferably, the portable wireless apparatus may further include: a housing driver for rotating the first and second housings in an opening direction; a release detector for detecting that the first and second housings are going to be opened from a closed state to produce a detection signal; and a housing driver controller for starting the housing driver rotating the first and second housings in the opening direction in response to the detection signal.

The housing driver controller may start the antenna driver controller when the angle formed between the first housing and the second housing reaches the third angle, so that the antenna driver starts rotating the antenna section in the opening direction.

The release detector may include: a predetermined button of a plurality of operation buttons provided on a first inner surface of the first housing; and a protrusion provided at a predetermined position on a second inner surface of the second housing, the predetermined position corresponding to the predetermined button on the first inner surface, wherein the second inner surface faces the first inner surface of the first housing when closed, wherein, when the first housing and the second housing are opened, the protrusion releases the predetermined button to produce a detection signal.

Since the movement of opening the first and second housings can be detected by releasing the predetermined button, a special key is not needed, resulting in reduced amount of hardware and reduced cost.

According to further another aspect of the present invention, a portable wireless apparatus includes: a first housing; a second housing coupled to the first housing by a hinge, wherein the first housing and the second housing are freely opened and closed around the hinge within a first predetermined range having a maximum of a first angle; an antenna section for use in wireless communication, coupled to the first and second housings by the hinge such that the antenna section is placed outside the second housing, wherein the antenna section is freely opened and closed around the hinge within a second predetermined range having a maximum of a second angle with respect to the second housing; an antenna driver for rotating the antenna section to make any angle formed between the first housing and tho second housing within the second predetermined range; a received signal strength detector for detecting a strength of a signal received by the antenna section; and an antenna driver controller for controlling the antenna driver to adjust an antenna angular of the antenna section so as to maximize the strength of a received signal.

Since an antenna angular of the antenna section is adjusted so as to maximize the strength of a received signal, best communication condition can be automatically obtained.

DESCRIPTION OF THE PREFERRED EMBODIMENTS

Embodiments of the present invention will be described in detail below.

Figure 3:
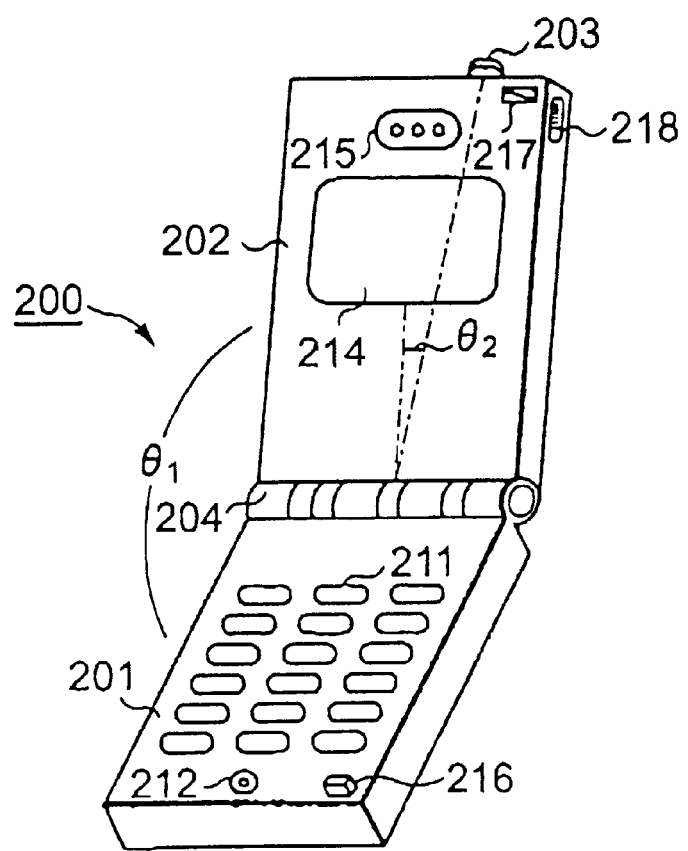
FIG. 3 is a perspective view showing the front side of a wireless terminal in the opened stage of two housings according to an embodiment of the present invention.

Referring to FIG. 3, a wireless terminal 200 according to an embodiment of the present invention is composed of a first housing 201, a second housing 202 and an antenna section 203 placed at the back of the second housing 202. The first and second housings 201 and 202 and the antenna section 203 are arranged to be each rotated predetermined ranges of angle by a hinge mechanism 204.

The first housing 201 is provided with a button operating portion 211 and a transmitting portion 212. The button operating portion 211 has a plurality of button switches on an inner surface of the first housing 201, which faces an inner surface of the second housing 202 when closed. The transmitting portion 212 is composed of a microphone (not shown) provided at the position corresponding to a speaker's mouth (not shown) in the case where the first housing 201 and the second housing 202 are opened to form a first angle $\theta_1$ as shown in FIG. 3.

The second housing 202 is provided will a liquid crystal display (LCD) 214 at the approximately center position of the inner surface of the second housing 202. Also, a receiving portion 215 composed of a speaker (not shown) is provided at the position corresponding to a user's ear when the first housing 201, and the second housing 202 are opened at the first angle $\theta_1$ as shown in FIG. 3. The antenna section 203 is arranged to form a second angle $\theta$, with respect to the outer surface (not shown in FIG. 3) opposing to the inner surface of the second housing 202.

On the inner surface of the first housing 201, a protrusion 216 is provided near the transmitting portion 212. Also, the inner surface of the second housing 202 has a latch hole 217 formed at the position corresponding to the protrusion 216 so that the protrusion 216 is inserted into the latch hole 217 to be latched. On the side surface near this latch hole 217 on the second housing 202, a slidable latch release portion 218 is provided. When the first housing 201 and the second housing 202 are closed, the protrusion 216 is engaged with the latch hole 217 to be latched, and the first housing 201 and the second housing 202 are held in the closed state. When the slidable latch release portion 218 is slid in an axial direction of the antenna section 203, the latch is released by a well-known mechanism and the first housing 201 and the second housing 202 are opened as shown in FIG. 3. Such a mechanism will be described in detail later.

Figure 4:
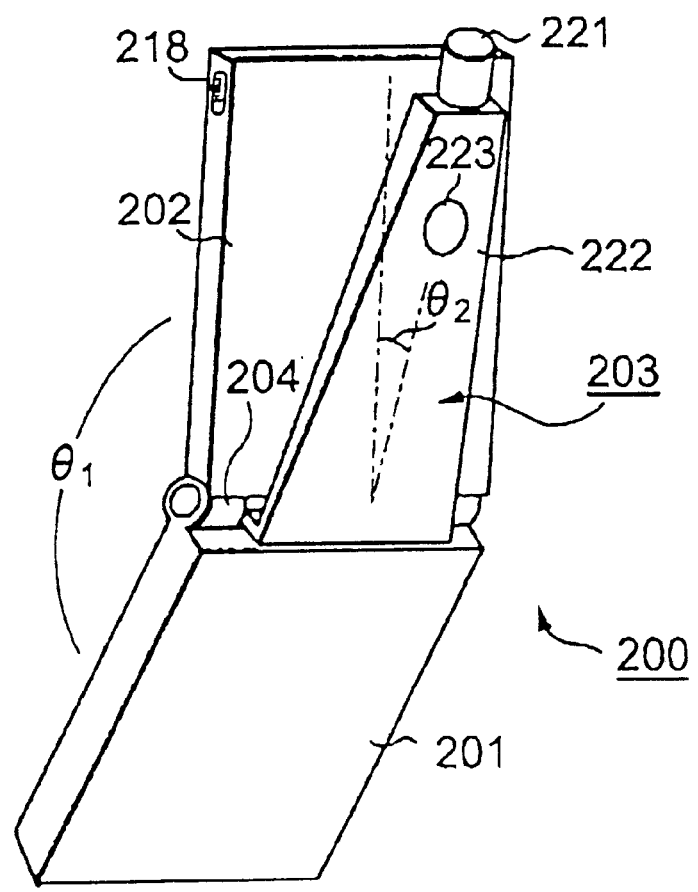
FIG. 4 is perspective view showing the back side of the wireless terminal according to the embodiment.

Referring to FIG. 4, the antenna section 203 is composed of a head portion 221 having the end portion of an antenna device embedded therein and an antenna main body 222 widening toward the bottom end thereof near the hinge mechanism 204. At the relatively upper position of antenna main body 222, an incoming call indicator 223 is provided, which is composed of a lamp that indicates an incoming call by lightening or blinking. The antenna device, which is accommodated in the antenna section 203 along the longitude direction from the head portion 221 towards the antenna main body 222 thereof, extends to near the bottom end thereof. Since the length of the antenna device is slightly longer than that of the first housing 201 or the second housing 202 by an amount of the protruding head portion 221, the antenna device can provide sufficient performance as an antenna.

Figure 5:
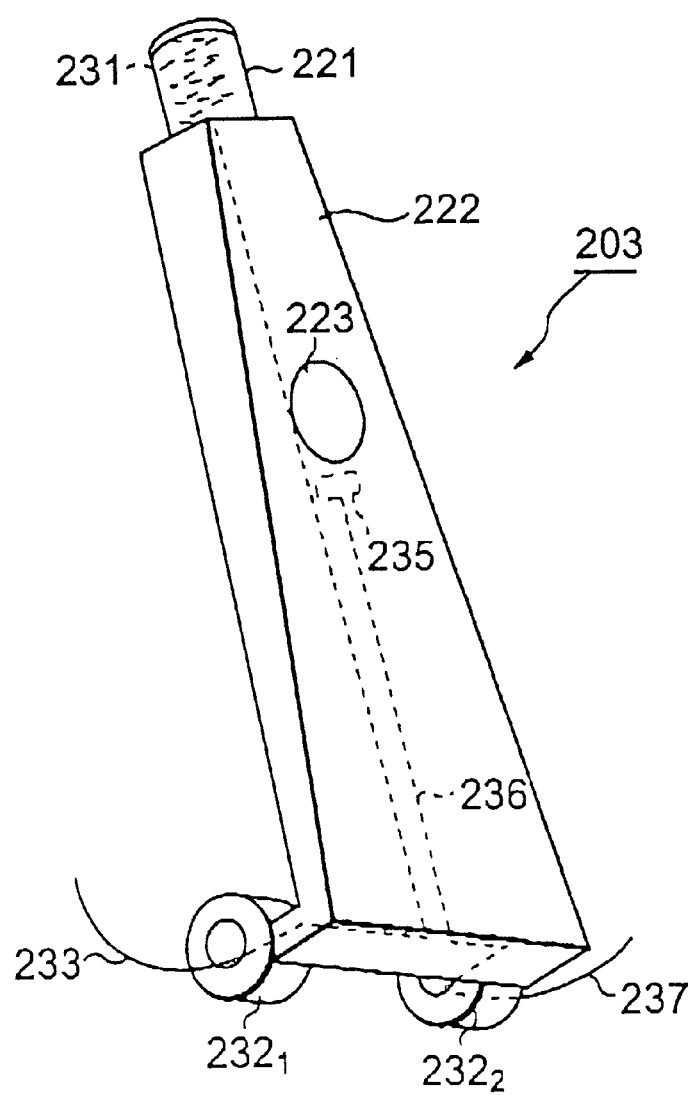
FIG. 5 is a perspective view showing an antenna section composed of an antenna and a hinge mechanism thereof in the embodiment.

Referring to FIG. 5, the antenna device 231 extends from the head portion 221 of the antenna section 203 to the bottom of the antenna main body 222, from which an antenna device cable 233 coated with resin is extended outwardly through the inside of a ring shaft portion 232 of the hinge mechanism 204. In the incoming call indicator 223, a light-emitting diode 235 and a control line 236 for control the light-emitting diode 235 are mounted in the antenna main body 222, and a light-emitting control cable 237 coated with resin connected to the control line 236 is extended outwardly through the inside of the other ring shaft portion $232_2$ of the hinge mechanism 204. These antenna device cable 233 and light-emitting control cable 237 are connected to connectors (not shown) providing an electrical connection to the inside of the first housing 201 through a clearance (not shown) in the hinge mechanism 204 as shown in FIG. 3. Through the connectors, the antenna device cable 233 and light-emitting control cable 237 are electrically connected to an antenna terminal of a printed board and a light-emitting control terminal, respectively.

The antenna section 203 in the present embodiment is formed by integrally molding with resin the head portion 221, the antenna main body 222, and two ring shaft portion $232_1$ and $232_2$ as well as the light-emitting diode 235 and the control line 236. Therefore, the whole antenna section 203 can be made thin and compact while keeping the strength of antenna section 203 in itself.

Figure 1:
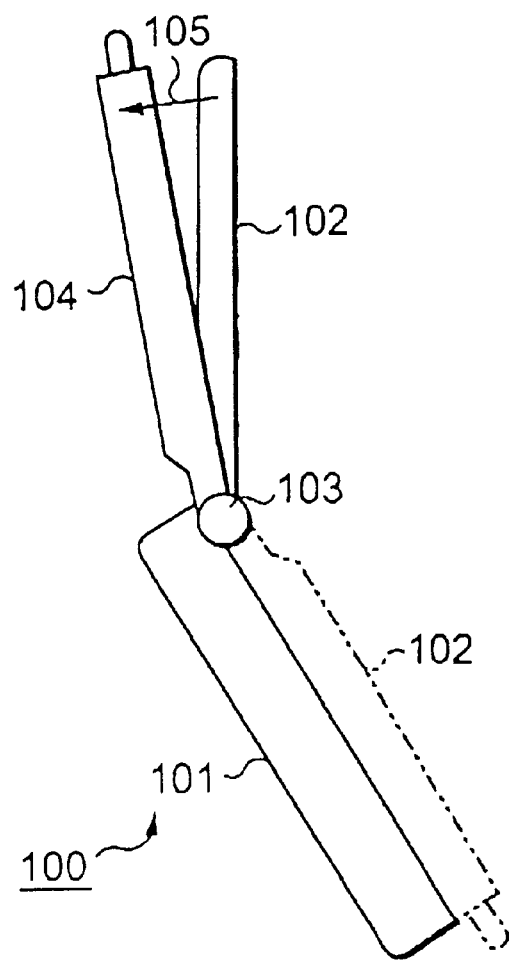
FIG. 1 is a side view showing a first example of a conventional wireless terminal.
Figure 2:
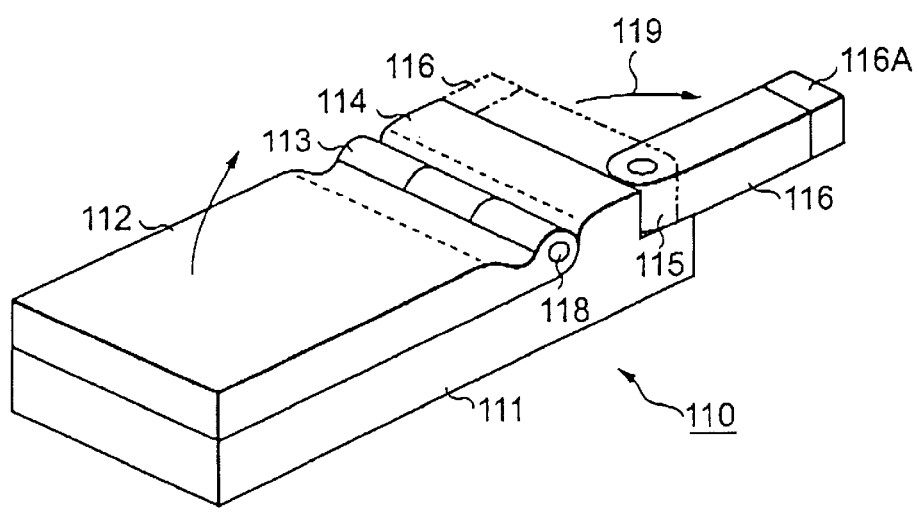
FIG. 2 is a perspective view showing a second example of a conventional wireless terminal.
Figure 6:
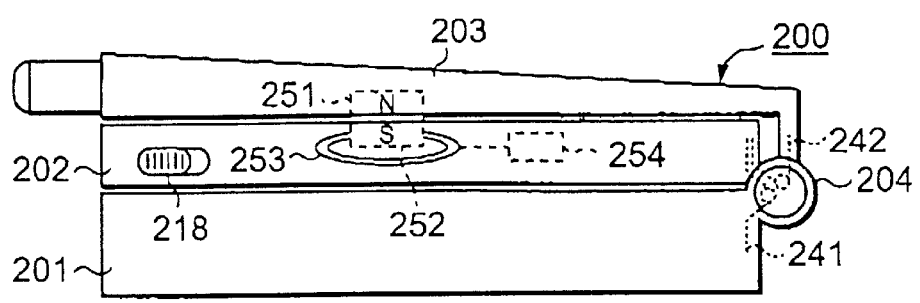
FIG. 6 is a side view showing the wireless terminal in the folded state according to the present embodiment.

As shown in FIG. 6, when the wireless terminal 200 is closed, the first housing 201 is overlaid with the second housing 202 on which the antenna section 203 is overlaid. Therefore, in a non-communication state (a waiting state) of the wireless terminal 200, the wireless terminal 200 can be compact in the entirely same manner of a conventional portable telephone. A spring force exerted by an opening spring 241 is applied to the first housing 201 and the second housing 202 so as to be opened to form the first angle $\theta_1$ as shown in FIG. 1. Also, in order not to rotate the second housing 202 and the antenna section 203 in excess of the first angle $\theta_1$ and the second angle $\theta_2$ respectively, a well-known technique for regulating the rotatation direction may be employed. For example, steps are formed on the slicing contact surface of the rotatable shaft of the hinge mechanism 204. Therefore, when the slidable latch release portion 218 is slid to release the latch of protrusion 216, the first housing 201 and the second housing 202 is allowed to rotate to form the maximum first angle $\theta_1$ by the hinge mechanism 204.

In addition, an N-pole magnet 251 is embedded at a predetermined position facing to the second housing 202 in the antenna section 203, add an S-pole magnet 252 is embedded at the position facing to the N-pole magnet 251 in the second housing 202. The S-pole magnet 252 has a coil 253 winded around it and the coil 253 is connected to an energizing circuit 254 for energizing the coil 253 to generate a magnetic field providing the opposite polarity (N pole) to be applied to the S-pole magnet 252. The magnitude of magnetic attraction force between the magnets 251 and 252 is set to the extent that the attraction force is greater than the opposite force to open the antenna section 203 generated by the opening spring 242.

When an energizing current flows through the coil 253 by the energizing circuit 254, even if it takes relatively short time, the magnet 252 works to cancel the magnetic attraction force or to weaken it in such an extent that the antenna opening force generated by the spring 242 becomes stronger than the magnetic attraction force. Therefore, when the energizing circuit 254 is activated, the antenna section 203 is released from the closed state by the antenna opening spring 242 to be rotated the maximum second angle $\theta_2$ as shown in FIG. 4.

Figure 7:
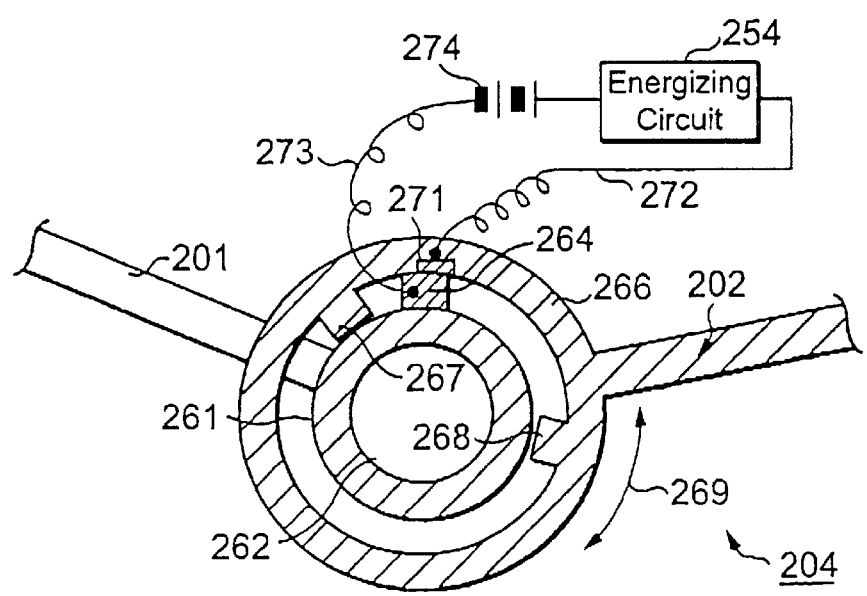
FIG. 7 is a sectional view of the hinge mechanism sectioned in the orthogonal direction of the center axis in order to describe the mechanism of rotation control.

Referring to FIG. 7, the hinge mechanism 204 has a first ring shaft portion 261 fixed to a center shaft 262 thereof arranged at the one end of the first housing 201. A protrusion 264 made of conductor is provided at a predetermined position of outer surface of the first ring shaft portion 261, and its top portion is slidably in contact with the internal surface of a second ring shaft portion 266, which is rotatably arranged with a predetermined spacing outside the first ring shaft portion 261. Two protrusions 267 and 268 protrude inwardly from the internal surface of the second ring shaft portion 266 towards the center axis thereof. The second ring shaft portion 266 is arranged at one end of the second housing 202, and is one part composing the hinge mechanism 204.

Assuming that the first housing 201 is fixed, the second ring shaft portion 266 is rotatable in a direction of an arrow 269 within the range where the rotating direction of protrusion 264 is regulated by the two protrusion 267 and 268. In this case, the rotatable angle range is the first angle $\theta_1$.

As shown in FIG. 7, the second ring shaft portion 266 has a conductor 271 formed at a position relatively near to the protrusion 267 on the internal surface thereof. The protrusion 264 and the conductor 271 are electrically connected to electric wires 272 and 273, respectively. Therefore, when the protrusion 216 (see FIG. 3) is released from the latch by sliding the slidable latch release portion 218 as shown in FIG. 3 to open the first housing 201 and the second housing 202, the protrusion 264 and the conductor 271 are electrically connected to each other in a relatively short interval just before the contact of protrusion 264 with protrusion 267 to stop the rotation. During this short interval the energizing circuit 254 is activated, and thereby the coil 254 is energized.

Figure 8:
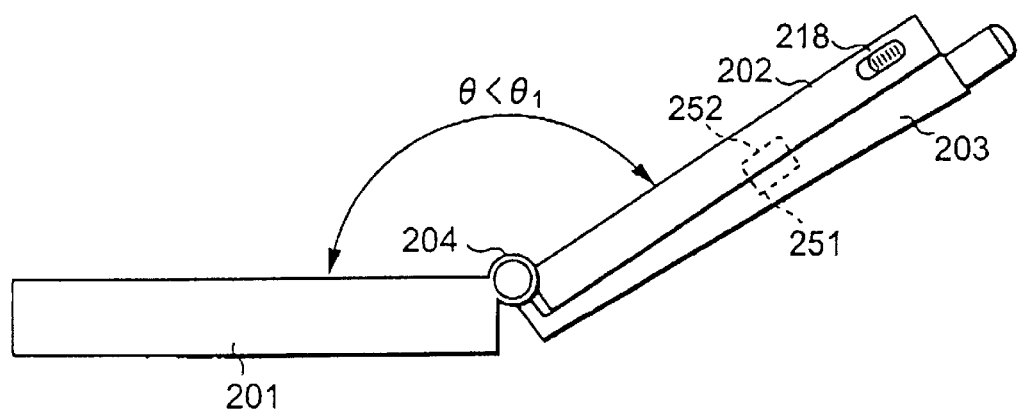
FIG. 8 is a side view showing an opened state of the wireless terminal at a moment just before a first housing and a second housing are rotated just a first angle $\theta_1$ by the hinge mechanism.

As shown in FIG. 8, when an angle $\theta$ formed between the first housing 201 and the second housing 202 is smaller than the predetermined first angle $\theta_1$, the protrusion 264 and the conductor 271 are not connected as described above. Therefore the N-pole magnet 251 and the S-pole magnet 252 attract each other and thereby the antenna section 203 is in contact with the second housing 202.

When the protrusion 264 and the conductor 271 are electrically connected to each other just before the contact of protrusion 264 with protrusion 267 as shown in FIG. 7, the energizing circuit 254 is activated to rotate the antenna section 203 the second angle $\theta_2$.

Figure 9:
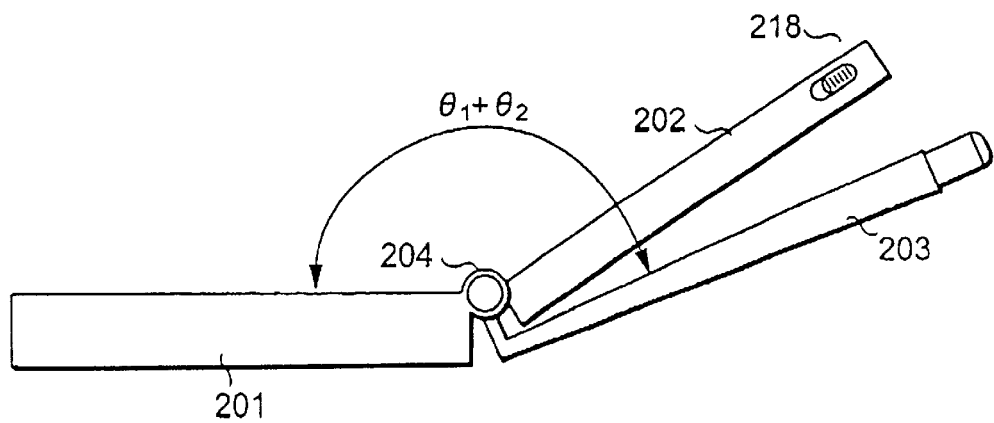
FIG. 9 is a side view showing an opened state after the antenna are rotated just a second angle $\theta_2$ with respect to the second housing.

As shown in FIG. 9, in this way, the second housing 202 and the antenna section 203 are held at the second angle $\theta_2$ and the first housing 201 and the second housing 202 are supposed to held at the first angle $\theta_1$.

As described above, only by sliding the slidable latch release portion 218 as shown in FIG. 3, the first and second housings 201 and 202 are opened and further the antenna section 203 is also unlatched from the second housing 202, so that a user can operate the button operating portion 211 (see FIG. 3) right now, and respond to the arrival of a call or start a dialing operation. Then, since the energizing circuit 254 in the present embodiment is activated just in the extremely short interval, a very small amount of electric power is consumed even if the wireless terminal is frequently opened and closed.

Modified Embodiment

Figure 10:
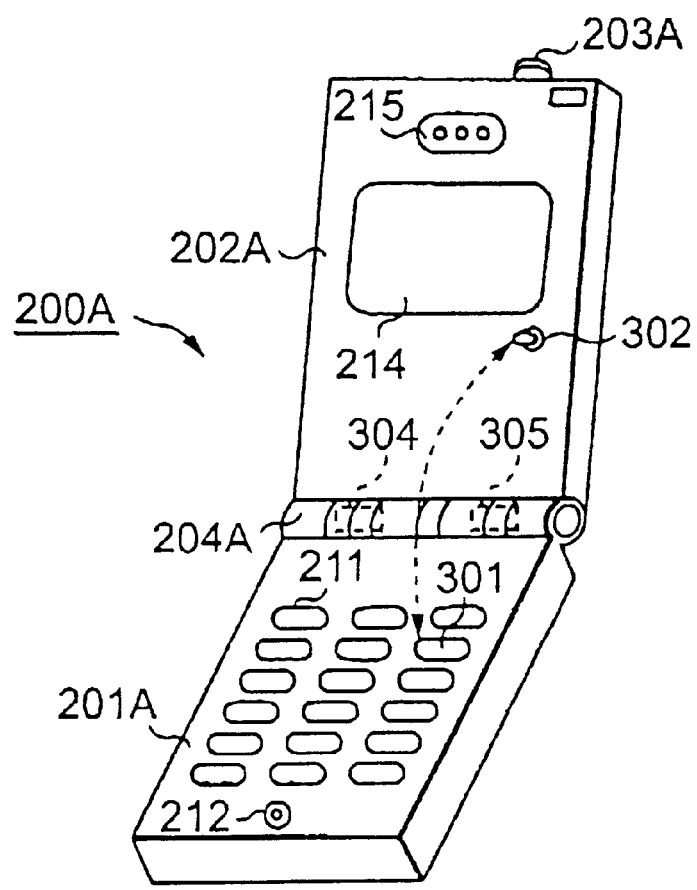
FIG. 10 is a perspective view showing a wireless terminal according to a modified embodiment of the present invention.

In FIG. 10, members of a wireless terminal 200A according to the modified embodiment similar to those previously described with reference to FIG. 3 are denoted by the same reference numerals and descriptions thereof will be omitted.

As shown in FIG. 10, the wireless terminal 200A is composed of a first housing 201A, a second housing 202a, an antenna section 203a, and a hinge mechanism 204A for rotatably coupling the first and second housings 201A and 202A. A protrusion 302 is provided on the inner surface of the second housing 202A at a position facing to a specific button 301 on the button operating portion 211 of the first housing 201A. Also, a first motor 304 and a second motor 305 each having speed reducing mechanism are provided in a space within the hinge mechanism 204A. The first motor 304 performs the open/close operation of the first housing 201A and the second housing 202A. The second motor 305 performs the open/close operation of the second housing 202A and the antenna section 203A.

Figure 11:
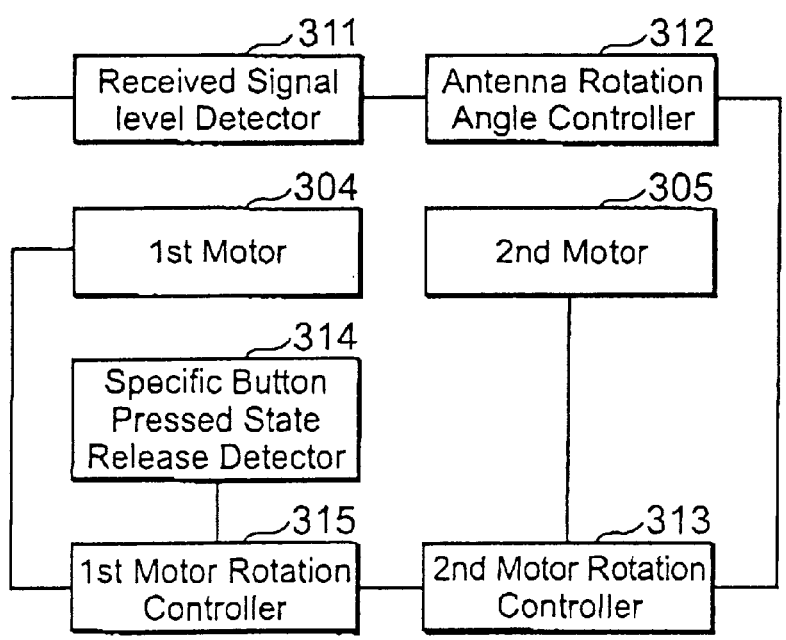
FIG. 11 is a block diagram showing a main part of the internal circuit of the wireless terminal according to the modified embodiment.

Referring to FIG. 11, a received signal level detector 311 detects the level of a signal received through the antenna section 203A. In the case where a best angle detection mode is selected, an antenna rotation angle controller 312 controls rotation of the second motor 5 through a second motor rotation controller 313 so as to detect the best angle of the antenna section 203A by rotating it in steps of a slight angle in a positive direction or a reverse direction, and continues to perform such a best angle detection control around the detected angle.

When the specific button 301 (see FIG. 10) is released from a long-time pressed state, a specific button pressed state release detector 314 detects the pressed state release and instructs the first motor rotation controller 315 to start the rotation of the first motor 304. Accordingly, when a user tries to open the first housing 201A and the second housing 202A, this movement is detected by the specific button pressed state release detector 314 and the first motor rotation controller 315 rotates the first motor 204 to open the first housing 201A and the second housing 202A at the first angle $\theta_1$. When opening the first housing 201A and the second housing 202A, the control of the motor rotation controller 313 is started at a predetermined timing to form the second angle $\theta_2$. In this manner, the opening control of the second housing 202A and the antenna section 203A is coupled with that of the first housing 201A and the second housing 202A.

On the other hand, the reverse operation of the above-described opening operation can be performed by a user performing a predetermined operation of the button operating portion 211 to control the first and second motor rotation controllers 315 and 313. Therefore, an accommodating operation between the first housing 201A and the second housing 202A, then between the second housing 202A and the antenna section 203A, is performed to close them.

Alternatively, it is possible to use a single motor to selectively drive the first housing 201a, the second housing 202A, and the antenna section 203A. In this case, both open/close operation between the first housing 201A and the second housing 202A and the open/close operation between the second housing 202A and the antenna section 203A can be carried out by the single motor. Then, the open/close operation only between the second housing 202A and the antenna section 203A may be automatically performed by only second motor 305. In this case, the second motor 305 may be driven when the first angle $\theta_1$ or the predetermined angle to be close to this angle $\theta_1$ is formed between the first housing 201A and the second housing 202A.

Furthermore, although the antenna section 203A controls the rotation angle only in the open/close direction of the first housing 201A and the second housing 202A to adjust the receiving sensitivity of the antenna, of course, it may control the rotation angle in a direction orthogonal to the open/close direction.

In the embodiment, although the first housing 201 has the N-pole magnet 251 therein and the second housing 202 has the S-pole magnet 252 therein, it is natural that the respective polarities may be interchanged.

In the embodiment and the modified embodiment, the activating timing of the energizing circuit 254 is determined by contact positions of the protrusion 264 and the conductor 271. However, the activating timing of the energizing circuit 254 may be determined by on/off output of an optical sensor under the same principle.

In the embodiment, the first housing 201 and the second housing 202A are opened and closed by a mechanically opened latch. However, if the position of magnet is controlled to change its force of attraction, then the same function can be realized as described as the conventional proposal.

Further, in the above embodiments, although the antenna having a fixed length is described, it is possible that such a configuration that the length is changeable as necessary may be employed.

Furthermore, in the modified embodiment, although the motors 304 and 305 are installed within the hinge mechanism 204A, the motors may be accommodated in either of the housings. Instead of motors, other components such as a solenoid may be also employed.

In the above embodiments, although a mobile telephone is described as a wireless terminal, it is apparent that the present invention can be applied to other wireless terminals having a wireless function and a voice input/output function in a same manner.

What is claimed is:

1. A portable wireless apparatus comprising:
    a first housing;
    a second housing coupled to the first housing by a binge, wherein the first housing and the second housing are freely opened and closed around the hinge within a first predetermined range having a maximum of a first angle;
    an antenna section for use in wireless communication, coupled to the first and second housings by the hinge such that the antenna section is situated at back of the second housing, wherein the antenna section is freely opened and closed around the hinge within a second predetermined range having a maximum of a second angle with respect to the second housing;
    an antenna energizing member for applying a force to the antenna section in an opening direction;
    an antenna latch member for latching the antenna section to the second housing to keep the antenna section in a closed state; and
    an antenna latch releasing mechanism for releasing a latch of the antenna latch member when an angle formed between the first housing and the second housing reaches a third angle within the first predetermined range.

2. The portable wireless apparatus according to claim 1, wherein the antenna energizing member is a spring urging the antenna section to rotate in the opening direction.

3. The portable wireless apparatus according to claim 1, wherein the antenna latch releasing mechanism comprises:
    an angle detector for generating a detection signal when the angle formed between the first housing and the second housing becomes equal to the third angle; and
    a latch releasing member for releasing the latch of the antenna latch member in response to the detection signal.

4. The portable wireless apparatus according to claim 1, wherein the antenna latch member comprises a first member provided in the second housing and a second member provided in the antenna section, wherein at least one of the first and second members is a magnet for attracting the first member and the second member to latch the antenna section to the second housing.

5. The portable wireless apparatus according to claim 4, wherein the antenna latch releasing mechanism comprises:
    an angle detector for generating a detection signal when the angle formed between the first housing and the second housing becomes equal to the third angle; and
    a latch releasing member for releasing the latch of the antenna latch member in response to the detection signal.

6. The portable wireless apparatus according to claim 5, wherein the antenna latch releasing member is a magnetic field generator for generating a magnetic field to weaken an attraction force of the first member and the second member so that the force generated by the antenna energizing member be stronger than the attraction force.

7. The portable wireless apparatus according to claim 6, wherein the antenna latch releasing member is provided in the hinge, wherein the angle detector generates the detection signal only when the angle formed between the first housing and the second housing is substantially equal to the third angle, wherein the magnetic field generator generates the magnetic field to weaken the attraction force only when the detection signal is generated.

8. The portable wireless apparatus according to claim 1, further comprising:
    a housing energizing member for applying a force to the first and second housings in an opening direction;
    a housing latch member for latching the first and second housings to each other to keep the first and second housings in a closed state; and
    a housing latch releasing mechanism for manually releasing a latch of the housing latch member.

9. A portable wireless apparatus comprising:
    a first housing;
    a second housing coupled to the first housing by a hinge, wherein the first housing and the second housing are freely opened and closed around the hinge within a first predetermined range having a maximum of a first angle;
    an antenna section for use in wireless communication, coupled to the first and second housings by the hinge such that the antenna section is situated at back of the second housing, wherein the antenna section is freely opened and closed around the hinge within a second predetermined range having a maximum of a second angle with respect to the second housing;

an antenna driver for rotating the antenna section in an opening direction; and an antenna driver controller for starting the antenna driver rotating the antenna section in the opening direction when an angle formed between the first housing and the second housing reaches a third angle within the first predetermined range.

10. The portable wireless apparatus according to claim 9, wherein the antenna driver controller comprises:

an angle detector for generating a detection signal when the angle formed between the first housing and the second housing becomes equal to the third angle; and a controller for starting the antenna driver rotating the antenna section in the opening direction in response to the detection signal.

11. The portable wireless apparatus according to claim 9, further comprising:

a housing driver for rotating the first and second housings in an opening direction;

a release detector for detecting that the first and second housings are going to be opened from a closed state to produce a detection signal; and a housing driver controller for starting the housing driver rotating the first and second housings in the opening direction in response to the detection signal.

12. The portable wireless apparatus according to claim 11, wherein the housing driver controller starts the antenna driver controller when the angle formed between the first housing and the second housing reaches the third angle, so that the antenna driver starts rotating the antenna section in the opening direction.

13. The portable wireless apparatus according to claim 11, wherein the release detector comprises:

a predetermined button of a plurality of operation buttons provided on a first inner surface of the first housing; and a protrusion provided at a predetermined position on a second inner surface of the second housing, the predetermined position corresponding to the predetermined button on the first inner surface, wherein the second inner surface faces the first inner surface of the first housing when closed, wherein, when the first housing and the second housing are opened, the protrusion releases the predetermined button to produce a detection signal.

14. A portable wireless apparatus comprising:

a first housing:

a second housing coupled to the first housing by a hinge, wherein the first housing and the second housing are freely opened and closed around the hinge within a first predetermined range having a maximum of a first angle;

an antenna section for use in wireless communication, coupled to the first and second housings by the hinge such that the antenna section is situated at back of the second housing, wherein the antenna section is freely opened and closed around the hinge within a second predetermined range having a maximum of a second angle with respect to the second housing;

an antenna driver for rotating the antenna section to make any angle formed between the first housing and the second housing within the second predetermined range;

a received signal strength detector for detecting a strength of a signal received by the antenna section; and an antenna driver controller for controlling the antenna driver to adjust an antenna angle of the antenna section so as to maximize the strength of a received signal, wherein the antenna driver controller further controls the antenna driver to start the antenna driver rotating the antenna section in an opening direction when an angle formed between the first housing and the second housing reaches a third angle within the first predetermined range.

15. The portable wireless apparatus according to claim 14, wherein the antenna driver controller comprises:

an angle detector for generating a detection signal when the angle formed between the first housing and the second housing becomes equal to the third angle; and a controller for starting the antenna driver rotating the antenna section in the opening direction in response to the detection signal.

16. The portable wireless apparatus according to claim 14, further comprising:

a housing driver for rotating the first and second housings in an opening direction;

a release detector for detecting that the first and second housings are going to be opened from a closed state to produce a detection signal; and a housing driver controller for starting the housing driver rotating the first and second housings in the opening direction in response to the detection signal.

17. The portable wireless apparatus according to claim 16, wherein the housing driver controller starts the antenna driver controller when the angle formed between the first housing and the second housing reaches the third angle, so that the antenna driver starts rotating the antenna section in the opening direction.

18. The portable wireless apparatus according to claim 16, wherein the release detector comprises:

a predetermined button of a plurality of operation buttons provided on a first inner surface of the first housing; and a protrusion provided at a predetermined position on a second inner surface of the second housing, the predetermined position corresponding to the predetermined button on the first inner surface, wherein the second inner surface faces the first inner surface of the first housing when closed, wherein, when the first housing and the second housing are opened, the protrusion releases the predetermined button to produce a detection signal.

* * * * *